(12) United States Patent
Miller et al.

(10) Patent No.: US 12,545,818 B2
(45) Date of Patent: Feb. 10, 2026

(54) SNAP-CURE FLEXIBLE ELECTRICALLY CONDUCTIVE ONE COMPONENT (1K) EPOXY ADHESIVE COMPOSITION

(71) Applicant: Henkel AG & Co. KGaA, Duesseldorf (DE)

(72) Inventors: Peter Joseph Miller, Duesseldorf (DE); Theresia Köhler, Sankt Augustin (DE); Daniel Buckland, Duesseldorf (DE); Marc Estruga Ortiga, Regensburg (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 18/952,528

(22) Filed: Nov. 19, 2024

(65) Prior Publication Data

US 2025/0075109 A1 Mar. 6, 2025

Related U.S. Application Data

(63) Continuation of application No. PCT/EP2023/062226, filed on May 9, 2023.

(30) Foreign Application Priority Data

May 31, 2022 (EP) .................... 22176293

(51) Int. Cl.
*C09J 9/02* (2006.01)
*C09J 4/06* (2006.01)
(Continued)

(52) U.S. Cl.
CPC . *C09J 9/02* (2013.01); *C09J 4/06* (2013.01); *C09J 11/04* (2013.01); *C09J 11/06* (2013.01); *C09J 163/00* (2013.01); *H10F 19/902* (2025.01)

(58) Field of Classification Search
CPC .... H10F 19/902; C09J 9/02; C09J 4/06; C09J 11/04; C09J 11/06; C09J 163/00
See application file for complete search history.

(56) References Cited

U.S. PATENT DOCUMENTS 6,228,288 B1 * 5/2001 Chacko .................... H01B 1/24
252/514
7,740,734 B2 6/2010 Sudo et al.
(Continued)

FOREIGN PATENT DOCUMENTS

CN 106010321 A 10/2016
EP 3943564 A1 1/2022
(Continued)

OTHER PUBLICATIONS

Machine translation of CN-106010321-A, Wang, Shan-sheng. (Year: 2016).*
(Continued)

*Primary Examiner* — Mayla Gonzalez Ramos
(74) *Attorney, Agent, or Firm* — Steven C. Bauman

(57) ABSTRACT

The present invention relates to an electrically conductive composition comprising a) from 5 to 25% by weight of the total weight of the composition of a cycloaliphatic epoxide resin; b) from 0.05 to 10% by weight of the total weight of the composition of a vinyl ether; c) from 0.1 to 0.45% by weight of the total weight of the composition of an onium salt; d) from 0.01 to 10% by weight of the total weight of the composition of a radical initiator; e) from 45 to 85% by weight of the total weight of the composition of electrically conductive particles; and f) from 0.1 to 10% by weight of the total weight of the composition of an organic solvent. The composition can be used as an adhesive in the electronic applications, especially as an adhesive in the shingle module photovoltaic applications.

15 Claims, 2 Drawing Sheets

1a

1b (51) Int. Cl.
*C09J 11/04* (2006.01)
*C09J 11/06* (2006.01)
*C09J 163/00* (2006.01)
*H10F 19/90* (2025.01)

(56) References Cited

U.S. PATENT DOCUMENTS

| | | |
|---|---|---|
| 8,309,633 B2 | 11/2012 | Burns |
| 9,862,866 B2 | 1/2018 | Sukata |
| 10,593,439 B2 | 3/2020 | Lee et al. |
| 2005/0256230 A1 | 11/2005 | Yamaguchi et al. |
| 2007/0208106 A1 | 9/2007 | Chen et al. |
| 2007/0213429 A1 | 9/2007 | Cheng et al. |
| 2015/0353779 A1* | 12/2015 | Mu .................. H01B 1/22 136/256 |
| 2021/0040358 A1 | 2/2021 | Matsuo et al. |

FOREIGN PATENT DOCUMENTS

| | | |
|---|---|---|
| WO | 2009067112 A1 | 5/2009 |
| WO | 2022043160 A1 | 3/2022 |

OTHER PUBLICATIONS

Rajaraman et al: "Interaction of Epoxy and Vinyl Ethers During Photoinitiated Cationic Polymerization", Journal of Polymer Science : Part A: Polymer Chemistry, vol. 37, No. 21, Nov. 1, 1999 (Nov. 1, 1999), pp. 4007-4018.

Scherzer et al: "Photoinitiated Cationic Polymerization of Cycloaliphatic Epoxide/Vinyl Ether Systems Studied by Near-Infrared Reflection Spectroscopy", Macromolecular Chemistry and Physics, vol. 208, No. 9, May 4, 2007 (May 4, 2007), pp. 946-954.

International Search Report for International Patent Application No. PCT/EP2023/062226—Mailing date: Jul. 28, 2023.

* cited by examiner

SNAP-CURE FLEXIBLE ELECTRICALLY CONDUCTIVE ONE COMPONENT (1K) EPOXY ADHESIVE COMPOSITION

TECHNICAL FIELD

The present invention relates to a snap-cure flexible electrically conductive one component (1 k) epoxy adhesive composition. The composition is suitable for use as an adhesive in the electronic applications, especially as an adhesive in the shingle module photovoltaic applications.

TECHNICAL BACKGROUND

A solar cell or a photovoltaic cell is an electrical device that converts the energy of light directly into electricity by the photovoltaic effect. Solar cells are the building blocks of photovoltaic modules, otherwise known as solar panels.

Figure 1:
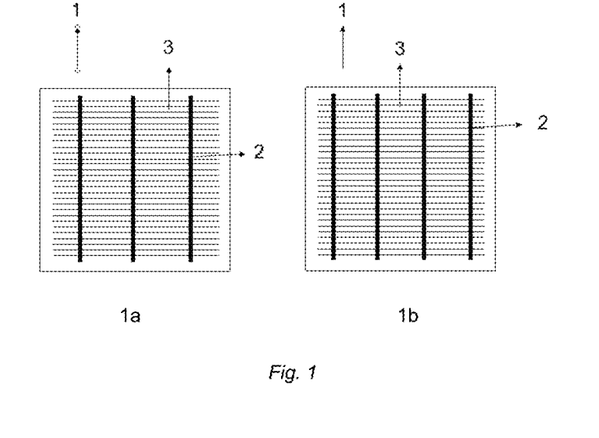
FIG. 1a illustrates a basic solar cell configuration with three busbars (2).
FIG. 1b illustrates a basic solar cell configuration with four busbars (2).

As illustrated in FIG. 1 most of the solar cells (1) produced today consist of crystalline silicon wafers on which metallic contacts—busbars (2) and fingers (3)—are both printed, which contacts serve to collect the current generated by the cell. For illustrative purposes only, FIG. 1a illustrates a basic solar cell configuration with three busbars (2) and FIG. 1b illustrates a basic solar cell configuration with four busbars (2).

Figure 2:
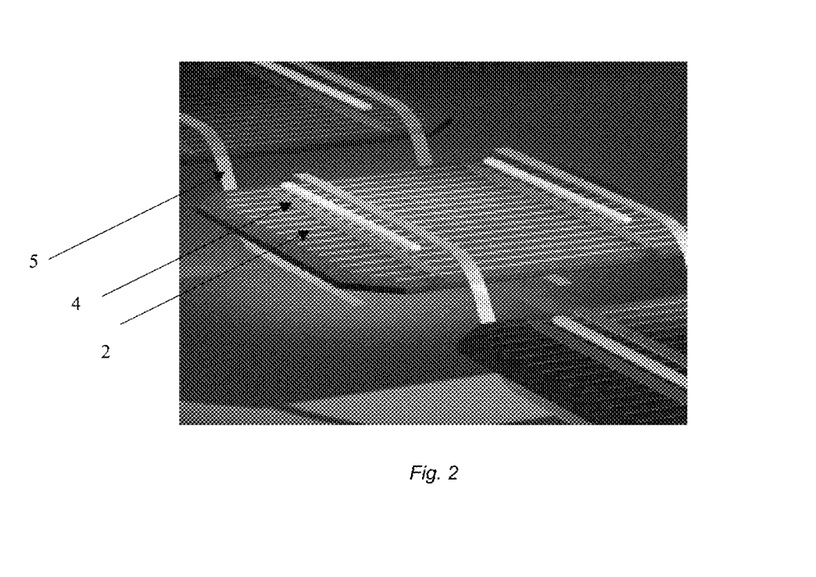
FIG. 2 illustrates how the finger lines (3) collect the current from the silicon solar cell surface and transfer it to tabbing ribbons (5) through the busbars.

The array of straight, parallel and equally spaced thin fingers (3) covers a small portion of the light receiving surface of each individual silicon solar cell (1). These finger lines (3) reduce the resistance to the photoelectric current and provide lower current losses. Further, the finger lines (3) collect the current from the silicon solar cell surface and transfer it to tabbing ribbons (5)—as illustrated in FIG. 2, through the busbars (2), which busbars are electric current conducting lines. The busbars (2) are disposed parallel to each other, are equally spaced and are orthogonal to the finger lines (3) array. The tabbing ribbon (5) is soldered to the surface of the busbars and facilitates transfer of the electric current from the connected silicon solar cells onwards to another silicon solar cell, to an accumulator or to a solar inverter.

Both busbars (2) and finger lines (3) are conventionally comprised of either high-temperature firing pastes or low temperature, non-firing type pastes—for heat sensitive solar cells, such as heterojunction (HJT or HIT) or tandem (perovskite-based) solar cells—and are usually realized by a one or two-stage printing process, which lays down these metallic contacts across and along the solar cell: the use of two successive printing stages facilitates the use of different materials for the busbars and finger lines respectively and also reflects the need to print busbars at a width thinner than finger lines. When printing the front side grid in two successive stages, typically, the finger lines (3) are printed and dried first and the busbars (2) are printed over the finger lines. While a single print step would result in similar heights of the busbar and the finger lines, in two-stage printing, in order to have secured contact between the finger lines and the busbars, and due to possible miss-alignment between the two patterns, there is a need for an overlap between the two patterns. In the overlap areas of the finger lines and busbars the height will be different than in the area where finger lines or busbars only are printed.

When the ribbons (5) are attached to the busbars (2) by means of a soldering process, those ribbons (5) are thus disposed on top of the busbars and—where disposed on the front of solar cells—cause a shadow area to extend over the solar cell: this shadow, concomitantly with the surface area of the solar cell actually covered by the busbars themselves, leads to a decrease in the efficiency of the photovoltaic module.

Further problems associated with such solar cell structures include: resistive losses resultant from a high current passing through ribbons (5) of small cross-section; differential thermal contraction of the ribbons (5) and the silicon wafer which can result in high stress in the metallization and silicon; and, stress and micro-cracks in the silicon wafer caused by the local effects of heat and pressure in the soldering process, which effects stymie the development of thinner wafers.

As a consequence of these problems, new solar module concepts have been developed which make use of new interconnection technologies and new solar cell types: by way of example, note may be made of multiwire interconnection on busbarless cells and conductive backsheet interconnection with back-contact cells. The present invention is however more particularly concerned both with the use of conductive adhesives in place of soldering and with series connected cells module structures, especially with shingled cells module structures.

Figure 3:
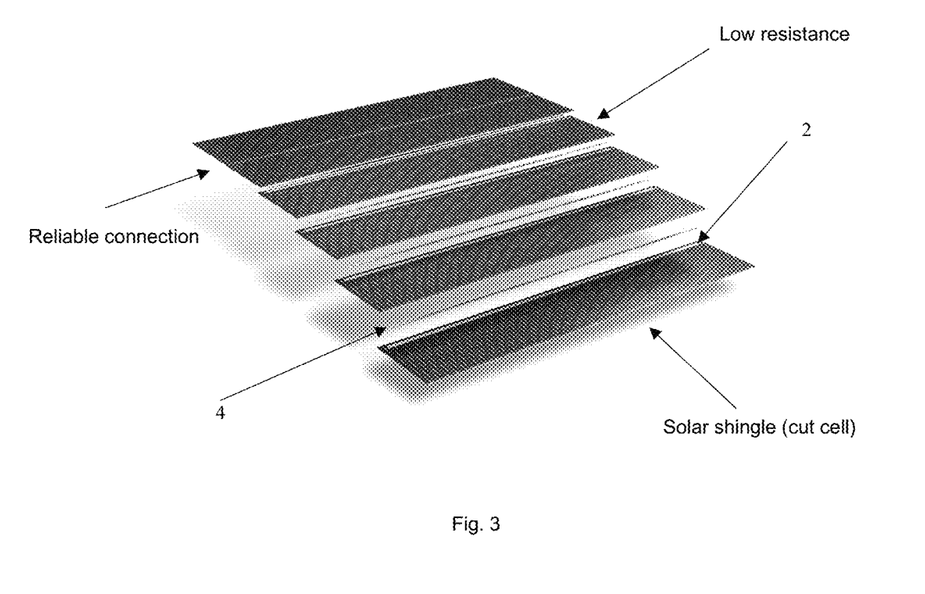
FIG. 3 illustrates the shingled cells module structure.

In the shingled cells module structure illustrated FIG. 3, solar strips are presented which are rectangular or substantially rectangular in shape. The long side usually has a length corresponding to the side length of a standard solar wafer—historically 156 mm but presently increasing in size, even up to 210 mm—and the short side has a length of only a few centimetres. Such solar cell strips have been cut out or diced from a processed device of standard size—such as, but not limited to, a 156 mm×156 mm device—with due care taken to avoid cracks and like structural failures during the cutting or dicing process. The cells have busbars or rows of interconnection pads along the long edge, one on the front and one on the back. To create a cells string, an interconnection material is applied to connect the rear busbar of a cell with the front busbar of the next cell. The cells overlap each other slightly, so that the front busbars are covered by the edge region of the adjacent cell, just like shingles on a roof. Given that: i) there is no spacing between cells as compared to conventional modules; ii) the cell area that is shaded by the front busbar is covered by an active area of another cell; and, iii) there is no ribbon covering the cells' front surface to cause shading, this shingle structure results in modules with an extremely high active area to total area ratio, allowing in principle very high module efficiency.

The adjacent cells in a given string are bonded to each other at the overlapping portions of the solar cells with an electrically conductive material (4) which can be deposited in different patterns. Electrically conductive adhesive (ECA) as a material to bond the solar cells together presents the advantage that the adhesives overcome mechanical stresses which build up due to coefficient of thermal expansion (CTE) mismatches between the different materials used in a photovoltaic assembly.

Electrically conductive adhesives (ECA) are highly filled materials, typically characterized by having at least 40 wt. % and most of the time greater than 60 wt. % or even 80 wt. % of conductive filler particles, as required to ensure multiple percolation paths and provide good electrical conductivity and low contact resistance. Unfortunately, conductive filler particles do not provide reinforcing properties and do not contribute to material cohesion. As a result, an electrically conductive adhesive's intrinsic mechanical strength is much poorer than the same materials without filler.

It will be recognized that photovoltaic modules are subjected to temperature changes and high mechanical stresses over their life cycle. Whilst these factors have a negative effect on the lifetime of the photovoltaic module, they also impose requirements on the thermo-mechanical properties of the electrically conductive adhesive used to bond the constituent solar and/or photovoltaic cells together: the adhesives should overcome mechanical stresses which build up due to coefficient of thermal expansion (CTE) mismatches between the different materials used in the photovoltaic assembly; and, the polymer matrix of the adhesive should desirably not pass through its glass transition temperature (Tg) within the operating range of the module such that it is in a glassy, brittle state at strongly negative temperatures (−10° C. and below).

Aside from the properties of the obtained cured adhesive, the curing profile of the adhesive is also of great import. It is important that: the shelf life of the adhesive at room temperature is practicable; the cure time is practicable at a temperature which does not deleteriously affect the electronic components and metalized features; faster cure in combination with lower cure temperature enables a high throughput in manufacturing of assembled parts; the adhesive is applicable—preferably dispensable or printable—and curable within an industrial process for high volume manufacturing; and, bleeding of the adhesive from the constituent joints is negligible.

Compositions described in the literature are often more rigid, less conductive or with lower adhesion properties. Thermoset epoxy resins have the advantage that they can vary between very rigid to very flexible materials but if the adhesive is too flexible, stable electrical contacts to solar cell are difficult to keep and the contact resistance of the adhesive to the solar tends to increase during thermocycling between −40° C. and 85° C. and/or during ageing at 85° C. in high humidity environments (85% humidity). However, typical electrically conductive epoxies need relatively long cure times to develop enough adhesion and they may be too rigid to survive thermal reliability testing.

Therefore, there is a need for an adhesive composition which provide faster cure speed and lower cure temperature in order to achieve high throughput in manufacturing of the assembled parts while providing flexibility and the ability to absorb mechanical stress to ensure long term reliability performance of the electronic component or device.

SUMMARY

The present invention relates to an electrically conductive composition comprising a) from 5 to 25% by weight of the total weight of the composition of a cycloaliphatic epoxide resin; b) from 0.05 to 10% by weight of the total weight of the composition of a vinyl ether; c) from 0.1 to 0.45% by weight of the total weight of the composition of an onium salt; d) from 0.01 to 10% by weight of the total weight of the composition of a radical initiator; e) from 45 to 85% by weight of the total weight of the composition of electrically conductive particles; and f) from 0.1 to 10% by weight of the total weight of the composition of on organic solvent.

The present invention also encompasses a cured product of the electrically conductive composition according to the present invention.

The present invention relates to use of an electrically conductive composition according to the present invention as an adhesive in the electronic applications, preferably as an adhesive in the shingle module photovoltaic applications.

The present invention also relates to a photovoltaic module comprising a series-connected string of two or more solar cells in a shingle pattern having an electrically conductive bonding between said two or more solar cells, wherein said electrically conductive bonding is formed with an electrically conductive composition or with a cured product according to the present invention.

DETAILED DESCRIPTION

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

As used herein, the term "consisting of" excludes any element, ingredient, member or method step not specified.

The words "preferred", "preferably", "desirably" and "particularly" are used frequently herein to refer to embodiments of the disclosure that may afford particular benefits, under certain circumstances. However, the recitation of one or more preferable, preferred, desirable or particular embodiments does not imply that other embodiments are not useful and is not intended to exclude those other embodiments from the scope of the disclosure.

As used throughout this application, the word "may" is used in a permissive sense—that is meaning to have the potential to—rather than in the mandatory sense.

The recitation of numerical end points includes all numbers and fractions subsumed within the respective ranges, as well as the recited end points.

All percentages, parts, proportions and then like mentioned herein are based on weight unless otherwise indicated.

When an amount, a concentration or other values or parameters is/are expressed in form of a range, a preferable range, or a preferable upper limit value and a preferable lower limit value, it should be understood as that any ranges obtained by combining any upper limit or preferable value with any lower limit or preferable value are specifically disclosed, without considering whether the obtained ranges are clearly mentioned in the context.

As used herein, the term "one component (1K) composition" refers to a composition where, during storage of the composition, the composition components are all admixed together but the properties of the composition, including viscosity, remain consistent enough over the time of storage to permit successful utility of the composition at a later time.

"Two-component (2K) compositions" are understood to be compositions in which a first component/part and a second component/part must be stored in separate vessels because of their (high) reactivity. The two components/parts are mixed only shortly before application and then react, typically without additional activation, with bond formation and thereby formation of a polymeric network. Herein higher temperatures may be applied in order to accelerate the cross-linking reaction.

As used herein, the term "snap cure" refers to fast cure times, typically 10-60 seconds at about 120-200° C.

All references cited in the present specification are hereby incorporated by reference in their entirety.

Unless otherwise defined, all terms used in disclosing the invention, including technical and scientific terms, have the meaning as commonly understood by one of the ordinary skilled in the art to which this invention belongs to. By means of further guidance, term definitions are included to better appreciate the teaching of the present invention.

The present invention relates to an electrically conductive composition comprising a) from 5 to 25% by weight of the total weight of the composition of a cycloaliphatic epoxide resin; b) from 0.05 to 10% by weight of the total weight of the composition of a vinyl ether; c) from 0.1 to 0.45% by weight of the total weight of the composition of an onium salt; d) from 0.01 to 10% by weight of the total weight of the composition of a radical initiator; e) from 45 to 85% by weight of the total weight of the composition of electrically conductive particles; and f) from 0.1 to 10% by weight of the total weight of the composition of an organic solvent.

The composition according to the present invention is a snap cure electrically conductive epoxy adhesive having low electrical contact resistance to metallisation parts of silicon solar cell, low volume resistivity, high flexibility and high adhesion to metallisation parts of silicon solar cells.

The electrically conductive composition according to the present invention comprises a cycloaliphatic epoxide resin. The cycloaliphatic epoxide resin is used because resins containing one epoxy cyclohexane ring cure faster than aromatic epoxy resins or aliphatic epoxy resins.

The suitable cycloaliphatic epoxide resin contains at least one epoxy cyclohexane ring and is preferably selected from the group consisting of bis(7-oxabicyclo[4.1.0]hept-3-ylmethyl)adipate, (3',4'-epoxycyclohexane)methyl 3,4-epoxycyclohexylcarboxylate, 7-oxabicyclo[4.1.0]heptan-3-ylmethyl acrylate, 3,4-epoxycyclohexane carboxylic acid methyl ester, bis(oxiran-2-ylmethyl) cyclohexane-1,2-dicarboxylate, and mixtures thereof, preferably selected from the group consisting of bis(7-oxabicyclo[4.1.0]hept-3-ylmethyl) adipate, (3',4'-epoxycyclohexane)methyl 3,4-epoxycyclohexylcarboxylate, and mixtures thereof.

Above listed cycloaliphatic epoxy resins are preferred because of their fast cure properties.

Suitable commercially available cycloaliphatic epoxide resins for use in the present invention include but are not limited to Celloxide 2021 P from Daicel Corporation and Omnilane OC 3005 from IGM Resins.

The electrically conductive composition according to the present invention comprises the cycloaliphatic epoxide resin from 5 to 25% by weight of the total weight of the composition, preferably from 8 to 20% by weight of the total weight of the composition, and more preferably from 11 to 19%.

The above range is preferred because less than 5% of cycloaliphatic epoxy resins may imply a lack of binder in a composition whereas more than 25% may result in too rigid polymer.

The electrically conductive composition according to the present invention comprises a vinyl ether. Vinyl ether is desired in the composition because it enables to obtain snap cure at low temperature.

Preferably the vinyl ether is aliphatic vinylether, more preferably selected from the group consisting of 4-hydroxybutylvinylether, diethylene glycol divinylether, cyclohexane-dimethanol divinylether, dodecylvinylether, cyclohexyl divinylether, 2-ethyhexyl vinyl ether, dipropyleneglycol divinylether, hexanediol divinylether, octadecyl vinyl ether, butanediol divinylether, triethyleneglycol divinylether and mixtures thereof, preferably selected from the group consisting of 4-hydroxybutylvinylether, diethylene glycol divinylether and mixtures thereof.

The above vinyl ethers are preferred because they are electron rich vinyl ethers, and they react fast with free radicals.

Suitable commercially available vinyl ethers for use in the present invention include but are not limited to 4-hydroxybutylvinylether and diethylene glycol divinylether from BASF.

The vinyl ether is present from 0.05 to 10% by weight of the total weight of the composition, preferably from 0.1 to 5%, and more preferably from 0.25 to 2%.

The above range is preferred because less than 0.05% of vinyl ether may not result in snap cure at low temperature, whereas more than 10% may result in outgassing.

The electrically conductive composition according to the present invention comprises an onium salt. Onium salt is preferred because the radical addition intermediate reacts with the onium salt in a preferred way compared to other photoinitiators.

Suitable onium salts for use in the present invention include iodonium salts, sulfonium salts, diazonium salts, ammonium salts or a mixture of those salts.

In one embodiment, the onium salt is iodonium salt of the formula in which R is independently selected from phenyl, halophenyl, (for example, chlorophenyl) and C1-C20 alkylphenyl (for example, dodecyl phenyl) X is any suitable counter anion, for example, a halogen anion, $CF_3SO_3^-$, $C_6H_5SO_3^-$, $NO_3^-$, $AsF_6^-$, $SbF_6^-$, $FeCl_4^-$, $SbCl_6^-$, $BF_4^-$, $PF_6^-$, and $(C_6F_5)B^-$.

Preferably the onium salt is selected from the group consisting of cumyltolyl iodonium tetrakis(pentafluorophenyl)borate, [4-(acetyloxy)phenyl]methyl(phenylmethyl)sulfonium hexafluorophosphate, (4-hydroxyphenyl methyl (1-naphtalenylmethyl)sulfonium hexa fluorophosphate, 4-(acetoxyphenyl)benzyl(methyl)sulfonium, tetrakis (pentafluorophenyl)borate, and mixtures thereof, more preferably the onium salt is cumyltolyol iodonium tetrakis(pentafluorophenyl)borate.

Above onium salts are preferred because they cure fastest with the radical addition intermediate compared to other photoinitiators.

Suitable commercially available onium salt for use in the present invention include but is not limited to Bluesil PI 2074 from Elkem.

The composition according to the present invention comprises onium salt from 0.1 to 0.45% by weight of the total weight of the composition, preferably from 0.15 to 0.4%, and more preferably from 0.15 to 0.3%.

The above range is preferred because less than 0.1% of onium salt may result in that the reaction will not proceed, whereas more than 0.45% may not provide any further benefit but increase the costs.

The electrically conductive composition according to the present invention comprises a radical initiator. Suitable radical initiator for use in the present invention is a peroxide, preferably an organic peroxide.

In one embodiment of the invention, the free radical initiator comprises or consists of at least one peroxide compound represented by the formula:

wherein: Rp is an aliphatic or aromatic group containing up to 18 carbon atoms, and Rq is H or an aliphatic or aromatic group containing up to 18 carbon and preferably wherein: Rp and Rq are C1-C12 alkyl, C6-C18 aryl or C7-C18 aralkyl groups.

Preferably the radical initiator is selected from the group consisting of cumene hydroperoxide (CHP); para-menthane hydroperoxide; t-butyl hydroperoxide (TBH); t-butyl perbenzoate; t-butyl peroxy pivalate; di-t-butyl peroxide; t-butyl peroxy acetate; t-butyl peroxy-2-hexanoate; t-amyl hydroperoxide; 1,2,3,4-tetramethylbutyl hydroperoxide; benzoyl peroxide; dibenzoyl peroxide; 1,3-bis(t-butylperoxyisopropyl) benzene; diacetyl peroxide; butyl 4,4-bis(t-butylperoxy) valerate; p-chlorobenzoyl peroxide; t-butyl cumyl peroxide; di-t-butyl peroxide; dicumyl peroxide; di(dodecanoyl) peroxide; 2,5-dimethyl-2,5-di-t-butylperoxyhexane; 2,5-dimethyl-2,5-di-t-butyl-peroxyhex-3-yne; and, 4-methyl-2,2-di-t-butylperoxypentane, t-butyl peroxyneodecanoate and mixtures thereof, preferably radical initiator is t-butyl peroxyneodecanoate.

These preferred peroxide compound based radical initiators provide ideal balance between profile, cure speed, adhesion and electrical properties.

Suitable commercially available radical initiator for use in the present invention include but is not limited to Luperox DCP, Luperox P and Luperox 10 from Arkema.

The composition according to the present invention comprises the radical initiator from 0.01 to 10% by weight of the total weight of the composition, preferably from 0.02 to 5% and more preferably from 0.05 to 2.0%.

The above range is preferred because less than 0.01% of radical initiator may result in poor cure performance, whereas more than 10% may result in poor pot life.

The electrically conductive composition according to the present invention comprises electrically conductive particles.

The electrically conductive particles may be acicular, spherical, ellipsoidal, cylindrical, bead-like, cubic, or platelet-like may be used alone or in combination. The electrically conductive particles may be for example a mixture of spherical particles and flake particles. Moreover, it is envisaged that agglomerates of more than one particle type may be used.

The electrically conductive particles will conventionally have an average volume particle size, as measured by laser diffraction/scattering methods, of from 300 nm to 50 μm, preferably from 500 nm to 40 μm, more preferably from 500 nm to 30 μm.

In a highly preferred embodiment, the electrically conductive particles have D10 about 10 μm, D50 about 5 μm and D90m about 12 μm.

In the aforementioned measurement method, the particle size is measured by particle size analyser and the particle shape is analysed by scanning electron microscope. In short, scattered laser lights from the particles are detected an array of detectors. Theoretical calculation is carried out to fit the measured distribution of scattered light intensity. During the fitting process the particle size distribution is deduced and inter alia D10, D50 and D90 values are calculated accordingly.

Particle size is measured by using particle size distribution (PSD) method. The average particle size is measured in the present invention through laser diffractometry preferably using a Malvern Mastersizer 2000 or Malvern Mastersizer 3000 available from Malvern Instruments Ltd. or Horiba LA-950V2 from Horiba Ltd. In this technique, the size of particles in suspensions or emulsions is measured using the diffraction of a laser beam, based on application of either Fraunhofer or Mie theory. In the present invention, Mie theory or a modified Mie theory for non-spherical particles is applied and the particle sizes relate to scattering measurements at an angle from 0.02 to 135 degrees relative to the incident laser beam.

For surety, it is noted that suitable electrically conductive particles for use in the present invention may be a mixture of particles having a small particle size and particles having a larger particle size.

In an independent characterization of the particles, which may or may not compliment the aforementioned particle size distribution, it is preferred that the electrically conductive particles have a tap density from 0.5 to 6.0 g/cm$^3$, preferably from 0.5 to 5.5 g/cm$^3$ and more preferably from 0.5 to 5.0 g/cm$^3$ as determined in accordance to ISO 3953 using a 25 cm$^3$ graduated glass cylinder. The principle of the method specified is tapping a specified amount of powder in a container by means of a tapping apparatus until no further decrease in the volume of the powder takes place. The mass of the powder divided by its volume after the test gives its tap density.

In an independent characterization of the particles, which may or may not compliment the aforementioned particle size distribution, it is preferred that the electrically conductive particles have specific surface area from 0.3 to 2 m$^2$/g, preferably from 0.5 to 1.5 m$^2$/g and more preferably from 0.75 to 1.3 m$^2$/g. The term "specific surface area" as used herein refers to the BET specific surface area which is determined in accordance to ASTM B922-10 widely using nitrogen as an analysis gas.

Preferably the conductive particles are selected from the group consisting of silver, nickel, carbon, carbon black, graphite, graphene, copper, gold, platinum, aluminium, iron, zinc, cobalt, lead, tin alloys, silver coated nickel, silver coated copper, silver coated graphite, silver coated polymers, silver coated aluminium, silver coated glass, silver coated carbon, silver coated boron nitride, silver coated aluminium oxide, silver coated aluminium hydroxide, nickel coated graphite, and, mixtures thereof, preferably electrically conductive filler is selected from the group consisting of silver, carbon black, graphite, graphene, copper, silver coated nickel, silver coated copper, silver coated graphite, silver coated polymers, silver coated aluminium, silver coated glass, silver coated carbon, silver coated boron nitride, silver coated aluminium oxide, silver coated aluminium hydroxide, nickel coated graphite, and, mixtures thereof, more preferably the electrically conductive particles are selected from the group consisting of silver, silver coated copper, silver coated graphite, silver coated polymers and mixtures thereof.

Suitable commercially available electrically conductive particles for use in the present invention include but are not limited to SF91, SF 98 and SF102 from Ames Goldsmith and EA-SA-0200 and SA-0201 from Metalor.

The composition according to the present invention comprises the electrically conductive particles from 45 to 85% by weight of the total weight of the composition, preferably from 63 to 78%, and more preferably from 68 to 75%.

The above range is preferred because less than 45% of electrically conductive particles may result in too high resistivity, whereas more than 85% may result in brittle adhesive with high costs.

The electrically conductive composition according to the present invention comprises an organic solvent. The organic solvent is used to dissolve the onium salt.

Preferably the organic solvent is polar aprotic solvent or a protic solvent or mixtures thereof, more preferably selected from the group consisting of acetone, ethyl acetate, dimethylformamide, acetonitrile, dimethyl sulfoxide, butyl lactate, propylene carbonate, 2-oxepanone polymer with 2,2-dimethyl-1,3-propanediol, polycaprolactone diol, and mixtures thereof.

Suitable commercially available solvents for use in the present invention include but are not limited to Capromer PD1-10 and Capromer PD1-20 from BASF; Placcel 205UT, Placcel 205H and Placcel 210 from Daicel; and propylene carbonate from Sinopharm.

The composition according to the present invention comprises the organic solvent from 0.1 to 10% by weight of the total weight of the composition, preferably from 0.15 to 5%, and more preferably from 0.2 to 2%.

The above range is preferred because less than 0.1% of solvent may dissolve all onium salt leaving lumps in the composition, whereas more than 10% may result in outgassing.

The electrically conductive composition according to the present invention may further comprise a thermoset modifier resin. The thermoset modifier resin is preferred because it is providing flexibility to the final polymer (not to be too rigid). If the final polymer is too rigid the composition may fail mechanical load test which are required especially in solar application.

A suitable thermoset modifier resin for use in the present invention is epoxy resin, oxetane resin, (meth)acrylate resin, siloxane resin and mixtures thereof. It is noted that the suitable thermoset modifier resin, when present and when it is an epoxy resin it is different from the above-described cycloaliphatic epoxide resin.

The thermoset modifier resin may be selected from the group consisting of aliphatic epoxy resin, epoxy novolac resin, bisphenol-A-epoxy resin, bisphenol-F-epoxy resin, hydrogenated bisphenol-A-epoxy resin, hydrogenated bisphenol-F-epoxy resin, bisphenol-A epichlorohydrin based epoxy resin, propylene glycol epoxy resin, reaction products of polyether-polyol with epichlorohydrin, polycarbonatediol based glycidyl ethers, epichlorohydrin formaldehyde phenol resin, epichlorohydrin phenol novolac resin, epichlorohydrin o-cresol novolac resin, epichlorohydrin m-xylenediamine resin, epichlorohydrin diamino diphenyl methane resin, epichlorohydrin trimethylol propane resin, epoxy silicone co-polymers and mixtures thereof.

In a preferred embodiment, the thermoset modifier resin is selected from the group consisting of 1,6-hexanediol diacrylate, 3-ethyl-3-[((2-ethylhexyl)-oxy)methyl]oxetane, bis[1-ethyl(3-oxetanyl)]methyl ether, 1,4-bis[(3-ethyl-3-oxetanylmethoxy)methyl]benzene, 1,3-bis(glycidylpropyl) tetramethyldisiloxane, epoxypropoxypropyl terminated polydimethylsiloxane (8-11), 1,3-bis[2-(3,4-epoxycyclohexyl)ethyl]tetramethyldisloxane and mixtures thereof.

The above listed thermoset modifier resins are preferred because they may result in lower Tg and more flexible material, which is advantageous in the shingle module photovoltaic applications.

Suitable commercially available thermoset modifier resin for use in the present invention include but are not limited to EPALLOY® 7200 from Huntsman, Epiclon EXA-4850 available from DIC, SIB1115.0 fro Gelest, Capa 2201A from Ingevity and EPON® Resin 825 available from Hexion.

The thermoset modifier resin may be present from 0.2 to 9.5% by weight of the total weight of the composition, preferably from 1 to 8% and more preferably from 1 to 7%.

The above range is preferred because less than 0.2% of thermoset modifier resin may negatively impact on the composition by reducing cure speed and increasing volume resistivity, whereas more than 9.5% may result negative effect on the mechanical bend test performance.

The electrically conductive composition according to the present invention may further comprise a toughener. The toughener is preferred in the composition because it may help to avoid stress propagation, especially during mechanical load testing.

Suitable toughener for use in the present invention may be epoxy elastomer adducts and/or toughening rubber in the form of core-shell rubber particles.

The term "core shell rubber" or CSR is being employed in accordance with its standard meaning in the art as denoting a rubber particle core formed by a polymer comprising an elastomeric or rubbery polymer as a main ingredient and a shell layer formed by a polymer which is graft polymerized onto the core. The shell layer partially or entirely covers the surface of the rubber particle core in the graft polymerization process. By weight, the core should constitute at least 50 wt. % of the core-shell rubber particle.

The polymeric material of the core should have a glass transition temperature ($T_g$) of no greater than 0° C. and preferably a glass transition temperature ($T_g$) of −20° C. or lower, more preferably −40° C. or lower and even more preferably −60° C. or lower. The polymer of the shell is non-elastomeric, thermoplastic or thermoset polymer having a glass transition temperature ($T_g$) of greater than room temperature, preferably greater than 30° C. and more preferably greater than 50° C.

The core may be comprised of a diene homopolymer, for example, a homopolymer of butadiene or isoprene; a diene copolymer, for example a copolymer of butadiene or isoprene with one or more ethylenically unsaturated monomers, such as vinyl aromatic monomers, (meth)acrylonitrile or (meth)acrylates; polymers based on (meth)acrylic acid ester monomers, such as polybutylacrylate; and, polysiloxane elastomers such as polydimethylsiloxane and crosslinked polydimethylsiloxane.

Similarly, the shell may be comprised of a polymer or copolymer of one or more monomers selected from: (meth) acrylates, such as methyl methacrylate; vinyl aromatic monomers, such as styrene; vinyl cyanides, such as acrylonitrile; unsaturated acids and anhydrides, such as acrylic acid; and, (meth)acrylamides. The polymer or copolymer used in the shell may possess acid groups that are cross-linked ionically through metal carboxylate formation, in particular through forming salts of divalent metal cations. The shell polymer or copolymer may also be covalently cross-linked by monomers having two or more double bonds per molecule.

It is preferred that any included core-shell rubber particles have an average particle size (d50) of from 10 nm to 300 nm, for example from 50 nm to 250 nm: said particle size refers to the diameter or largest dimension of a particle in a distribution of particles and is measured via dynamic light scattering. For completeness, the present application does not preclude the presence of two or more types of core shell rubber (CSR) particles with different particle size distributions in the composition to provide a balance of key properties of the resultant cured product, including shear strength, peel strength and resin fracture toughness.

The core-shell rubber may be selected from commercially available products, examples of which include but are not limited to Paraloid EXL 265°A, EXL 2655 and EXL2691 A, available from The Dow Chemical Company; Clearstrength® XT100, available from Arkema Inc.; the Kane Ace® MX series available from Kaneka Corporation, and in particular MX 120, MX 125, MX 130, MX 136, MX 551, MX553; and, METABLEN SX-006 available from Mitsubishi Rayon.

The toughener may be present from 1 to 10% by weight of the total weight of the composition, preferably from 1.5 to 9% and more preferably from 2 to 8%.

The above range is preferred because less than 1% of toughener may not result in any technical benefit, whereas more than 10% may result in to increase viscosity of the composition too high.

The electrically conductive composition according to the present invention may further comprise an adhesion promoter. An adhesion promoter may be added to the composition to improve the adhesion of the epoxy resin to a substrate. Adhesion promoters may function by forming a new layer at the interface which binds strongly to both the substrate and the adhesive composition. The resultant interfacial region may also be more resistant to chemical attack from the environment.

The selection of adhesion promoter may be determined by the type of surface to which the composition will be applied. That said, the most common commercial adhesion promoters are organosilanes of which certain epoxy functional organosilanes types have been mentioned hereinbefore.

Suitable adhesion promoters to be used in the present invention are for example silane compounds such as mercaptopropyltrimethoxysilane, β-(3,4-epoxycyclohexyl)ethyltrimethoxysilane, γ-glycidoxypropyltrimethoxysilane, and 3-acryloxypropyltrimethoxysilane, N-β-(aminoethyl)-γ-aminopropyltrimethoxysilane, bis-(γ-trimethoxysilylpropyl)amine, N-β-(aminoethyl)-gamma-aminopropylmethyldimethoxysilane, tris-(γ-trimethoxylsilyl)isocyanurate and mixtures thereof.

Suitable commercially available adhesion promoter for use in the present invention include but is not limited to Silquest A-187 from Momentive.

The adhesion promoter may be present from 0.01 to 10% by weight of the total weight of the composition, preferably from 1.5 to 9% and more preferably from 2 to 8%.

If the quantity of an adhesion promoter is less than 0.01, it may not provide ideal adhesion strength. On the other hand, quantity more than 10% may not improve the adhesion strength, but just saturate the composition.

The electrically conductive composition according to the present invention may further comprise a radical inhibitor. The radical inhibitor in the composition may scavenge and stabilize free radicals that may come from the premature decomposition of the peroxide.

In a highly preferred embodiment, the radical inhibitor is present in the composition.

The radical inhibitor may be selected from the group consisting of butylated hydroxytoluene, 4-hydroxyphenyldimethylsulfonium methylsulfate, 2-tert-butyl-1,4-benzoquinone, tert-butylhydroquinone, 1,4-benzoquinone, hydroquinone, 4-methoxyphenol, phenothiazine, 6-tert-butyl-2,4-xylenol, 2,6-di-tert-butylphenol, 2,6-di-tert-butyl-p-cresol and mixtures thereof, preferably the radical inhibitor is butylated hydroxytoluene.

Suitable commercially available radical inhibitor for use in the present invention include but is not limited butylated hydroxytoluene from TCI Chemicals.

The radical inhibitor may be present from 0.01 to 0.05% by weight of the total weight of the composition, preferably from 0.02 to 0.04%.

The above range is preferred because less than 0.01% of radical inhibitor may lead to a shorter pot life, whereas more than 0.05% may negatively impact on cure speed.

The electrically conductive composition according to the present invention has preferably viscosity from 10 to 70 Pa·s at 15 s−1, wherein the viscosity is measured according to the test method listed in the examples section below. The electrically conductive composition according to the present invention has preferably a thinning index (TI) from 1.2 to 6, wherein the TI is measured according to the test method listed in the examples section below.

The electrically conductive composition according to the present invention has preferably die shear strength from 2 to 20 kg, preferably from 4 to 15, wherein the die shear strength is measured according to the test method listed in the examples section below.

The electrically conductive composition according to the present invention has preferably manual bend test result from 50 to 100%, preferably from 75 to 100%, wherein the manual bend force is measured according to the test method listed in the examples section below.

The present invention relates to a cured product of the electrically conductive composition according to the present invention. The composition can be snap cured in 10-60 seconds at temperature of from 120 to 200° C.

The electrically conductive composition according to the present invention can be used as an adhesive in the electronic applications, preferably as an adhesive in the shingle module photovoltaic applications.

The present invention is also directed to a photovoltaic module comprising a series-connected string of two or more solar cells in a shingle pattern having an electrically conductive bonding between said two or more solar cells, wherein said electrically conductive bonding is formed with an electrically conductive composition or a cured product of the electrically conductive composition according to the present invention.

The electrically conductive composition according to the present invention is applied by dispensing, jetting or printing, when the photovoltaic module is produced.

Examples

Test methods—the following test methods were used to measure physical properties of the examples:
Viscosity at 1.5 (AR-crs-p2 cm/200 μm) according to the method ISO 3219
Viscosity at 15 (AR-csr-p2 cm-200 μm) according to the method ISO 3219
VR 15 min 150° C. (Box oven) according to the method ASTM D 2739-72 (Adhesive track of 5.4 cm×5 mm×60 micron is printed on a glass slide and cured in a box oven for 15 min 150° C.)

VR 90 s 180° C. (Hot plate) according to the method ASTM D 2739-72 (Adhesive track of 5.4 cm×5 mm×60 micron is printed on a glass slide and cured on a hot plate for 90s at 180° C.)

VR 60 s 160° C. (Hot plate) according to the method ASTM D 2739-72 (Adhesive track of 5.4 cm×5 mm×60 micron is printed on a glass slide and cured on a hot plate for 60 s at 160° C.)

Die Shear Strength

Two lines of Kapton tape are attached on a ceramic board, leaving 2 mm spacing between them. A second layer of tape is applied on top of each line. Then, the adhesive is doctor bladed between the two lines and scraped with the help of a glass slide, achieving a wet thickness of about 70-90 microns. The Kapton tape is then removed and the 2×2 mm dies are placed on top of the adhesive track, applying gentle homogeneous pressure. The board is cured with the desired profile (60 s 160° C. on a hotplate (DSS 60 s 160° C. HP), 90 s 160° C. (DSS 90 s 160° C. HP) or 90 s 180° C. DSS 90 s 180° C. HP) and after 1-2 h of cool down, dies can be sheared off with a Dage die shear tester. Die shear strength is then reported in kg.

Manual Bend Test

An adhesive pattern consisting of 10 or 15 pads of 500×4000 micron is stencil printed on the front busbar of a shingled cell. A second shingle is manually assembled on top so that the adhesive connects the front busbar of the bottom shingle with the back busbar of the top one. This 2-shingle assembly is then cured on a hotplate with the desired cure profile (60 s 160° C. hotplate, 90 s 160° C. hotplate or 90 s 180° C. hotplate). After the cure, the assembly is left to cool down for five minutes and the two shingles are manually detached by hand applying a bending force. The qualitative adhesion force is proportional to the number of pads that show cell breakage: very high adhesion (VHA) corresponds to 100% of the pads showing cell breakage, high adhesion (HA) corresponds to 75% of the pads that show cell breakage, medium adhesion (MA) corresponds to 50% of the pads that show cell breakage and low adhesion (LA) corresponds to <=25% of the pads that show cell breakage. No adhesion (NA) corresponds to 0% cell breakage.

The following examples were prepared by mixing all the ingredients together.

Table 1 below lists comparative examples 1-3. These examples were prepared to investigate the impact of a radical initiator, vinyl ether, and epoxy resin on the composition.

TABLE 1

|  |  | Comparative Example 1 | Comparative Example 2 | Comparative Example 3 |
|---|---|---|---|---|
| Celloxide 2021P (cycloaliphatic epoxy resin) |  | 18.006 | 18.006 | — |
| Epotohto ZX 1059 (epoxy resin) |  |  |  | 17.831 |
| Silquest A-187 (adhesion promoter) |  | 0.220 | 0.220 | 0.220 |
| DER 732P (Epoxy resin, thermoset modifier resin) |  | 5.050 | 5.050 | 5.001 |
| SF98 (electrically conductive particles) |  | 73.670 | 73.670 | 73.670 |
| Luperox 10 (radical initiator) |  |  |  | 0.250 |
| Butylated hydroxytoluene (radical inhibitor) |  | 0.030 | 0.030 | 0.030 |
| 4-Hydroxybutylvinylether (vinyl ether) |  |  | 0.500 |  |
| Diethyleneglycol divinylether (vinyl ether) |  | 0.500 |  | 0.500 |
| Bluesil PI 2074 (onium salt) |  | 0.255 | 0.255 | 0.255 |
| Propylene carbonate (organic solvent) |  | 0.25 | 0.25 | 0.25 |
| OXT-212 (thermoset modifier resin) |  | 2.021 | 2.021 | 2.001 |
| OXT-221 (thermoset modifier resin) |  |  |  |  |
| Total |  | 100.00 | 100.00 | 100.00 |
| Viscosity at 1.5 (AR-crs-p2 cm/200 μm) | Pa · s | 20.94 | 17.37 | 36.90 |
| Viscosity at 15 (AR-csr-p2 cm-200 μm) | Pa · s | 8.34 | 8.13 | 11.90 |
| TI (visco 1.5 s−1/visco 15 s−1) |  | 2.5 | 2.1 | 3.1 |
| VR 15 min 150° C. (Box oven) | Ω * cm | 2.9E−04 | 2.7E−04 | 2.7E−04 |
| VR 90 s 180° C. (Hot plate) | Ω * cm | 2.0E−04 | 1.9E−04 | 2.4E−04 |
| VR 60 s 160° C. (Hot plate) | Ω * cm | 3.2E−04 | 2.6E−04 | 4.0E−04 |
| DSS 60 s 160° C. HP | kg | 19.16 | 16.63 | 4.77 |
| DSS 90 s 160° C. HP | kg | 19.99 | 16.46 | 5.07 |
| DSS 90 s 180° C. HP | kg |  |  |  |
| Manual bend test 30 s 160° C. HP |  | NA | NA |  |
| Manual bend test 60 s 160° C. HP |  | NA | NA |  |

Table 2 below shows Examples 4 and 5. These examples were prepared to investigate the impact of thermoset resin modifiers to the composition.

TABLE 2

|  |  | Example 4 | Example 5 |
|---|---|---|---|
| Celloxide 2021P (cycloaliphatic epoxy resin) |  | 17.830 | 17.830 |
| Silquest A-187 (adhesion promoter) |  | 0.220 | 0.220 |
| DER 732P (Epoxy resin, thermoset modifier resin) |  | 5.001 | 5.001 |
| SF98 (electrically conductive particles) |  | 73.670 | 73.670 |
| Luperox 10 (radical initiator) |  | 0.250 | 0.250 |
| Butylated hydroxytoluene (radical inhibitor) |  | 0.030 | 0.030 |
| Diethyleneglycol divinylether (vinyl ether) |  | 0.500 | 0.500 |
| Bluesil PI 2074 (onium salt) |  | 0.255 | 0.255 |
| Propylene carbonate (organic solvent) |  | 0.25 | 0.25 |
| OXT-212 (thermoset modifier resin) |  | 2.001 |  |
| OXT-221 (thermoset modifier resin) |  |  | 2.001 |
| Total |  | 100.00 | 100.00 |
| Viscosity at 1.5 (AR-crs-p2 cm/200 μm) | Pa · s | 36.90 | 22.34 |
| Viscosity at 15 (AR-csr-p2 cm-200 μm) | Pa · s | 11.90 | 8.82 |
| TI (visco 1.5 s−1/visco 15 s−1) |  | 3.1 | 2.5 |
| VR 15 min 150° C. (Box oven) | Ω * cm | 2.7E−04 | 2.7E−04 |
| VR 90 s 180° C. (Hot plate) | Ω * cm | 2.4E−04 | 2.7E−04 |
| VR 60 s 160° C. (Hot plate) | Ω * cm | 4.0E−04 | 4.9E−04 |
| DSS 60 s 160° C. HP | kg | 4.77 | 18.84 |
| DSS 90 s 160° C. HP | kg | 5.07 | 18.18 |
| DSS 90 s 180° C. HP | kg |  |  |
| Manual bend test 30 s 160° C. HP |  |  | LA |
| Manual bend test 60 s 160° C. HP |  |  | LA |

Table 1 shows the influence of vinyl ether, radical initiator, and epoxy resin on the manual bend test adhesion development. Only when a peroxide radical initiator is present with diethyleneglycol divinylether and in combination with the correct resin modifier is any adhesion obtained (Example 5). The importance of using a high percentage of cycloaliphatic epoxy resins compared with a standard epoxy resin can be seen when comparing Example 3 with the Examples in Table 2. The comparative examples 1-3 exemplify that no adhesion is developed and incomplete or no curing is observed independent of any divinyl ether or radical initiator combination.

Table 3 below lists components for examples 6 and 7. These examples were prepared to investigate the impact the thermoset modifier resin to the composition.

TABLE 3

|  | Example 6 | Example 7 |
|---|---|---|
| Silquest A-187 (adhesion Promoter) | 0.220 | 0.220 |
| SF98 (electrically conductive particles) | 73.670 | 73.670 |

TABLE 3-continued

|  |  | Example 6 | Example 7 |
|---|---|---|---|
| Luperox 10 (radical initiator) |  | 0.250 | 0.250 |
| Diethyleneglycol divinylether (vinyl ether) |  | 0.500 | 0.500 |
| Bluesil PI 2074 (onium salt) |  | 0.250 | 0.250 |
| Propylene carbonate (organic solvent) |  | 0.250 | 0.250 |
| Butylated hydroxytoluene (radical inhibitor) |  | 0.030 | 0.030 |
| Omnilane OC 3005 (cycloaliphatic epoxy resin) |  | 15.020 | 12.830 |
| Kane Ace MX 553 (toughener) |  | 6.810 | 3.000 |
| SR259 (thermoset modifier resin) |  | 3.000 | 3.000 |
| UviCure S150 (thermoset modifier resin) |  |  | 6.000 |
| Total |  | 100.00 | 100.00 |
| Viscosity |  |  |  |
| Visco at 1.5 (AR-crs-p2 cm/500 μm) | Pa · s | 34.74 | 48.39 |
| Visco at 15 (AR-csr-p2 cm-500 μm) | Pa · s | 6.78 | 7.14 |
| TI (visco 1.5 s−1/visco 15 s−1) |  | 5.1 | 6.8 |
| Volume Resistivity |  |  |  |
| VR 90 s 160° C. (Hot plate) | Ω * cm | 1.73E−03 | 6.10E−03 |
| Bend Test |  |  |  |
| Manual bend test 30 s 160° C. HP |  | LA | NA |
| Manual bend test 90 s 180° C. HP |  | VHA | HA |

Examples 5 and 6 in Table 3 demonstrate the importance of having a high percentage of cycloaliphatic epoxy resins in the formula for fast adhesion development on the manual bend test. Example 5 contains a higher percentage of Omnilane OC 3005 and Kane Ace MX toughener (core shell rubber particles dispersed in 3,4-epoxycyclohexylmethyl-3', 4'-epoxycyclohexane carboxylate) as opposed to Example 6 which contains UviCure S150 (a difunctional oxetane) instead. Example 5 develops lower adhesion even with a short and low temperature cure profile and very high adhesion with an extended and higher cure temperature cure profile. This suggests that the increased cycloaliphatic percentage in the formula either increases cure speed, increases bending performance, or a combination of the two. Also of note, in comparison with the examples given in Table 1, Examples 5 and 6 show higher volume resistivity.

Table 4 below lists components for examples 8-13. These examples were prepared to investigate the impact of electrically conductive particles and thermoset modifier resin to the composition.

TABLE 4

|  | | Ex. 8 | Ex. 9 | Ex. 10 | Ex. 11 | Ex. 12 | Ex. 13 |
|---|---|---|---|---|---|---|---|
| Silquest A-187 (adhesion Promoter) | | 0.22 | 0.21 | 0.21 | 0.21 | 0.21 | 0.21 |
| Luperox 10 (radical initiator) | | 0.25 | 0.25 | 0.25 | 0.25 | 0.25 | 0.25 |
| Diethyleneglycol divinylether (vinyl ether) | | 0.50 | 3.40 | 2.40 | 1.40 | 1.40 | 1.40 |
| Bluesil PI 2074 (Onium salt) | | 0.25 | 0.24 | 0.24 | 0.24 | 0.24 | 0.24 |
| Propylene carbonate (organic solvent) | | 0.25 | 0.24 | 0.24 | 0.24 | 0.24 | 0.24 |
| Butylated hydroxytoluene (radical inhibitor) | | 0.03 | 0.03 | 0.03 | 0.03 | 0.03 | 0.03 |
| Epalloy 7200 (toughener/thermoset resin modifier) | | 7.00 | 6.80 | 6.23 | 4.74 | 4.74 | 4.74 |
| SF98 (electrically conductive particles) | | 73.67 | | | | | |
| P892-29 (electrically conductive particles) | | | 71.52 | 71.52 | 71.52 | 71.52 | 71.52 |
| Omnilane OC 3005 (cycloaliphatic epoxy resin) | | 13.02 | 12.64 | 12.59 | 13.58 | 13.58 | 13.58 |
| DMS-E09 (thermoset modifier resin) | | | | 2.00 | 3.50 | | |
| SIB1092.0 (thermoset modifier resin) | | | | | | 3.50 | |
| SIB1115.0 (thermoset modifier resin) | | | | | | | 3.50 |
| Kane Ace MX 553 (toughener) | | 4.81 | 4.67 | 4.28 | 4.28 | 4.28 | 4.28 |
| Total | | 100.00 | 100.00 | 100.00 | 100.00 | 100.00 | 100.00 |
| Viscosity | | | | | | | |
| Visco at 1.5 (AR-crs-p2 cm/500 µm) | Pa · s | 141.5 | 144.0 | 120.0 | 107.0 | 132.0 | 101.0 |
| Visco at 15 (AR-csr-p2 cm-500 µm) | Pa · s | 37.55 | 27.00 | 34.00 | 26.00 | 46.00 | 22.00 |
| TI (visco 1.5 s − 1/visco 15 s − 1) | | 3.8 | 5.3 | 3.5 | 4.1 | 2.9 | 4.6 |
| Volume Resistivity | | | | | | | |
| VR 60 s 160° C. (Hot plate) | Ω * cm | 6.0E−03 | 2.2E−04 | 1.1E−04 | 2.0E−04 | 2.0E−04 | 2.1E−04 |
| Manual Bend Test | | | | | | | |
| Manual bend test 30 s 160° C. HP | | MA | MA | HA | VHA | VHA | VHA |
| DSS | | | | | | | |
| 160° C. 15 sec | kg | | | | 6.7 | 5.5 | 9 |
| 160° C. 90 sec | kg | | | | 14.8 | 13.09 | 14.6 |

Examples 8-13 in Table 4 demonstrate key findings relating to electrically conductive particle selection for low volume resistivity as well as the importance of flexible resin modifiers in obtaining very high manual bend test adhesion. Comparing examples 8 and 9, it can be seen that switching to P892-29 as opposed to SF98 electrically conductive particles significantly reduces volume resistivity even at lower loadings. This is evidence that electrically conductive particle selection has impact on performance.

Comparison to examples 8 to 13 show the importance of adding a flexibility resin modifier to the base epoxy resin system. High adhesion is only obtained with the addition of resin modifiers that contain a siloxane backbone, which is hypothesized to impart flexibility crucial to high adhesion for bending performance. Specifically comparing examples 10 and 13 show that very high adhesion can be obtained by simply increasing the flexible resin modifier.

Table 5 below lists components for examples 14-16. These examples were prepared to investigate the impact of thermoset modifier resins to the composition.

TABLE 5

|  | Example 14 | Example 15 | Example 16 |
|---|---|---|---|
| Silquest A-187 (adhesion Promoter) | 0.22 | 0.21 | 0.21 |
| Luperox 10 (radical initiator) | 0.25 | 0.25 | 0.25 |
| Diethyleneglycol divinylether (vinyl ether) | 1.4 | 0.4 | 0.25 |
| Bluesil PI 2074 (Onium salt) | 0.24 | 0.24 | 0.25 |
| Propylene carbonate (organic solvent) | 0.24 | 0.24 | 0.24 |
| Butylated hydroxytoluene (radical inhibitor) | 0.03 | 0.03 | 0.03 |
| Epalloy 7200 (toughener/thermoset resin modifier) | 1.74 | — | — |
| P892-29 (electrically conductive particles) | 71.52 | 71.52 | 72.39 |

TABLE 5-continued

|  |  | Example 14 | Example 15 | Example 16 |
|---|---|---|---|---|
| Omnilane OC 3005 (cycloaliphatic epoxy resin) |  | 13.58 | 14.58 | 13.75 |
| Capa 2201A (thermoset modifier resin) |  |  |  | 4.8 |
| SIB1115.0 (thermoset modifier resin) |  | 6.5 | 8.24 | 3.5 |
| Kane Ace MX 553 (toughener) |  | 4.28 | 4.28 | 4.33 |
| Total |  | 100.00 | 100.00 | 100.00 |
| Viscosity |  |  |  |  |
| Visco at 1.5 (AR-crs-p2 cm/500 μm) | Pa · s | 32.00 | 33.00 | 189.7 |
| Visco at 15 (AR-csr-p2 cm-500 μm) | Pa · s | 7.30 | 8.00 | 28.00 |
| TI (visco 1.5 s-1/visco 15 s-1) |  | 4.4 | 4.1 | 6.8 |
| Volume Resistivity |  |  |  |  |
| VR 60 s 160° C. (Hot plate) | Ω * cm | 2.0E−04 | 2.6E−04 | 4.0E−04 |
| Manual Bend Test |  |  |  |  |
| Manual bend test 30 s 160° C. HP |  | VHA | NA | VHA |

The examples in Table 5 demonstrate the impact of the resin modifiers on the manual bend test adhesion performance. Comparing the manual bend test results of examples 14, 15, and 16 shows the influence of resin modifier function and loading. In example 16, only SIB115.0 is used at relatively high loading and results in no adhesion on the manual bend test. Conversely, with lower loading of SIB1115.0 and the addition of a second resin modifier in Example 14 and 16 (Epalloy 7200 and Capa 2201A, respectively) very high adhesion on the manual bend test is obtained. These examples highlight that an optimal ratio of resins/modifiers results in the best adhesion.

What is claimed is:

1. An electrically conductive composition comprising
   a) from 5 to 25% by weight of the total weight of the composition of a cycloaliphatic epoxide resin;
   b) from 0.05 to 10% by weight of the total weight of the composition of a vinyl ether;
   c) from 0.1 to 0.45% by weight of the total weight of the composition of an onium salt;
   d) from 0.01 to 10% by weight of the total weight of the composition of a radical initiator;
   e) from 45 to 85% by weight of the total weight of the composition of electrically conductive particles; and
   f) from 0.1 to 10% by weight of the total weight of the composition of an organic solvent.

2. The electrically conductive composition according to claim 1, wherein the cycloaliphatic epoxide resin contains at least one epoxy cyclohexane ring and is selected from the group consisting of bis(7-oxabicyclo[4.1.0]hept-3-ylmethyl) adipate, (3',4'-epoxycyclohexane)methyl 3,4-epoxycyclohexylcarboxylate, 7-oxabicyclo[4.1.0]heptan-3-ylmethyl acrylate, 3,4-epoxycyclohexane carboxylic acid methyl ester, bis(oxiran-2-ylmethyl) cyclohexane-1,2-dicarboxylate, and mixtures thereof.

3. The electrically conductive composition according to claim 1, wherein the cycloaliphatic epoxide resin is present from 8 to 20% by weight of the total weight of the composition.

4. The electrically conductive composition according to claim 1, wherein the vinyl ether is selected from the group consisting of 4-hydroxybutylvinylether, diethylene glycol divinylether, cyclohexane-dimethanol divinylether, dodecylvinylether, cyclohexyl divinylether, 2-ethyhexyl vinyl ether, dipropyleneglycol divinylether, hexanediol divinylether, octadecyl vinyl ether, butanediol divinylether, triethyleneglycol divinylether and mixtures thereof.

5. The electrically conductive composition according to claim 1, wherein the vinyl ether is present from 0.1 to 5% by weight of the total weight of the composition.

6. The electrically conductive composition according to claim 1, wherein the onium salt is selected from the group consisting of cumyltolyl iodonium tetrakis(pentafluorophenyl)borate, [4-(acetyloxy)phenyl]methyl(phenylmethyl)sulfonium hexafluorophosphate, (4-hydroxyphenyl methyl (1-naphtalenylmethyl)sulfonium hexafluorophosphate, 4-(acetoxyphenyl)benzyl(methyl)sulfonium, tetrakis(pentafluorophenyl)borate, and mixtures thereof.

7. The electrically conductive composition according to claim 1, wherein the onium salt is present from 0.15 to 0.4% by weight of the total weight of the composition.

8. The electrically conductive composition according to claim 1, wherein the radical initiator is present from 0.02 to 5% by weight of the total weight of the composition.

9. The electrically conductive composition according to claim 1, wherein the electrically conductive particles are selected from the group consisting of silver, nickel, carbon, carbon black, graphite, graphene, copper, gold, platinum, aluminium, iron, zinc, cobalt, lead, tin alloys, silver coated nickel, silver coated copper, silver coated graphite, silver coated polymers, silver coated aluminium, silver coated glass, silver coated carbon, silver coated boron nitride, silver coated aluminium oxide, silver coated aluminium hydroxide, nickel coated graphite, and, mixtures thereof, electrically conductive filler is selected from the group consisting of silver, carbon black, graphite, graphene, copper, silver coated nickel, silver coated copper, silver coated graphite, silver coated polymers, silver coated aluminium, silver coated glass, silver coated carbon, silver coated boron nitride, silver coated aluminium oxide, silver coated aluminium hydroxide, nickel coated graphite, and, mixtures thereof.

10. The electrically conductive composition according to claim 1, wherein the electrically conductive particles are present from 63 to 78% by weight of the total weight of the composition.

11. The electrically conductive composition according to claim 1, wherein the organic solvent is a polar aprotic solvent or a protic solvent or mixtures thereof.

12. The electrically conductive composition according to claim 1, wherein the organic solvent is present from 0.15 to 5% by weight of the total weight of the composition.

13. A cured product of the electrically conductive composition according to claim 1.

14. A photovoltaic module comprising a series-connected string of two or more solar cells in a shingle pattern having an electrically conductive bonding between said two or more solar cells, wherein said electrically conductive bonding is formed with an electrically conductive composition according to claim 1.

15. The photovoltaic module according to claim 14, wherein said electrically conductive composition is applied by dispensing, jetting or printing.

* * * * *